United States Patent
Seidler

(10) Patent No.: US 7,171,449 B2
(45) Date of Patent: Jan. 30, 2007

(54) FRIEND-TO-FRIEND MAIL SYSTEMS AND METHODS

(75) Inventor: Lyn Seidler, Washington, DC (US)

(73) Assignee: United States Postal Service, Washington, DC (US)

(*) Notice: Subject to any disclaimer, the term of this patent is extended or adjusted under 35 U.S.C. 154(b) by 842 days.

(21) Appl. No.: 10/240,163

(22) PCT Filed: Jan. 31, 2002

(86) PCT No.: PCT/US02/02618

§ 371 (c)(1),
(2), (4) Date: Mar. 19, 2003

(87) PCT Pub. No.: WO02/061603

PCT Pub. Date: Aug. 8, 2002

(65) Prior Publication Data

US 2003/0158778 A1 Aug. 21, 2003

Related U.S. Application Data

(60) Provisional application No. 60/265,088, filed on Jan. 31, 2001.

(51) Int. Cl.
*G06F 15/16* (2006.01)
*G06F 17/00* (2006.01)
*G06B 17/02* (2006.01)

(52) U.S. Cl. .................................. 709/206; 705/410
(58) Field of Classification Search ............... 709/206; 705/410, 402
See application file for complete search history.

(56) References Cited

U.S. PATENT DOCUMENTS

| 5,717,989 A | 2/1998 | Tozzoli et al. |
|---|---|---|
| 5,822,739 A | 10/1998 | Kara |
| 6,101,487 A | 8/2000 | Yeung |
| 6,260,029 B1 | 7/2001 | Critelli |
| 6,278,976 B1 | 8/2001 | Kochian |
| 6,289,323 B1 | 9/2001 | Gordon et al. |
| 2006/0190121 A1* | 8/2006 | Magli-Schmitz et al. ... 700/130 |

* cited by examiner

*Primary Examiner*—Larry D. Donaghue
(74) *Attorney, Agent, or Firm*—Finnegan, Henderson, Farabow, Garrett, & Dunner L.L.P.

(57) ABSTRACT

Methods and systems are provided for a three party mailing service. The process may enable a first party, such as an advertiser, to create a mailpiece, such as a postcard, marked with a unique code. The mailpiece may be provided to a second party, such as a household, who can send the mailpiece without adding any postage to the mailpiece. The mailpiece may then be delivered to a third party, and the first party may be billed for the postage due for delivery of the mailpiece from the second party to the third party.

21 Claims, 6 Drawing Sheets

FRIEND-TO-FRIEND MAIL SYSTEMS AND METHODS

CROSS REFERENCE TO RELATED APPLICATIONS

This application is a 371 of PCT/US02/02618 filed Jan. 31, 2002 which claims priority to U.S. Provisional Application 60/265,088, filed Jan. 31, 2001.

DESCRIPTION OF THE INVENTION

Field of the Invention

The present invention relates to systems and methods for automated accounting for transportation of documents.

BACKGROUND OF THE INVENTION

A first party may create a mailpiece such as, for example, a greeting card, and then provide the mailpiece to a second party who sends the mailpiece to a third party. One scheme for three party mailing would require that the second party acquire the mailpiece and then add postage to the mailpiece prior to providing the mailpiece to a service provider for delivery to the third party. Various service providers (SP) such as, for example, the United States Postal Service (USPS™), Federal Express (FEDEX™), or United Parcel Service (UPS™), will deliver a mailpiece to a party for a fee. For example, a customer may purchase a greeting card and then add postage to the envelope prior to sending the greeting card to another person. Thus, the second party must determine an appropriate postage fee for the mailpiece and add the appropriate postage before providing the mailpiece to the SP for delivery.

In the alternative, the SP may agree to deliver the mailpiece to the third party and bill the third party for the postage on delivery. However, the third party may be unwilling to pay the fee, which reduces the probability that the mailpiece will be delivered. Additionally, requesting pay-on-delivery (POD) service may incur significantly higher service fees including, for example, first-class service fees and service charges for POD processing for the mailpiece.

SUMMARY OF THE INVENTION

Systems and methods consistent with the present invention may provide for automated accounting for transportation of documents, where a first party is billed for transportation of documents between a second party and a third party.

A method consistent with the present invention may provide a three party mailing service, comprising the steps of: enabling an advertiser to create a postcard marked with a unique code; receiving the postcard addressed to a third party from a household, wherein the household had not added any postage to the postcard; delivering the postcard to the third party; and billing the advertiser for the postage due for the delivery of the postcard to the third party.

Another method consistent with the present invention may provide a three party mailing service, comprising: enabling a first party to create a mailpiece marked with information identifying the first party; receiving the mailpiece from a second party, wherein the mailpiece is addressed to a third party; providing the mailpiece to a service provider for delivery; and billing the first party for delivery of the mailpiece.

A system consistent with the present invention may provide a three party mailing service, comprising: means for enabling a first party to create a mailpiece marked with information identifying the first party; means for receiving the mailpiece from a second party, wherein the mailpiece is addressed to a third party; means for providing the mailpiece to a service provider for delivery; and means for billing the first party for delivery of the mailpiece.

A computer program product, consistent with yet another aspect of the present invention, comprising a computer readable medium having computer program code embodied in said medium, may provide for a three party mailing service, wherein the program code comprises: code for enabling a first party to create a mailpiece marked with information identifying the first party; code for receiving the mailpiece from a second party, wherein the mailpiece is addressed to a third party; code for providing the mailpiece to a service provider for delivery; and code for billing the first party for delivery of the mailpiece.

Additional aspects of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings are included to provide a further understanding of the invention, are incorporated in and constitute a part of this specification, illustrate preferred embodiments of the invention, and together with the description, serve to explain the principles of the invention.

In the drawings.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts. Although the system set forth herein is described with respect to the USPS™, the system and methods described are not limited to the USPS™ but may be used with other service providers (SP).

Figure 1:
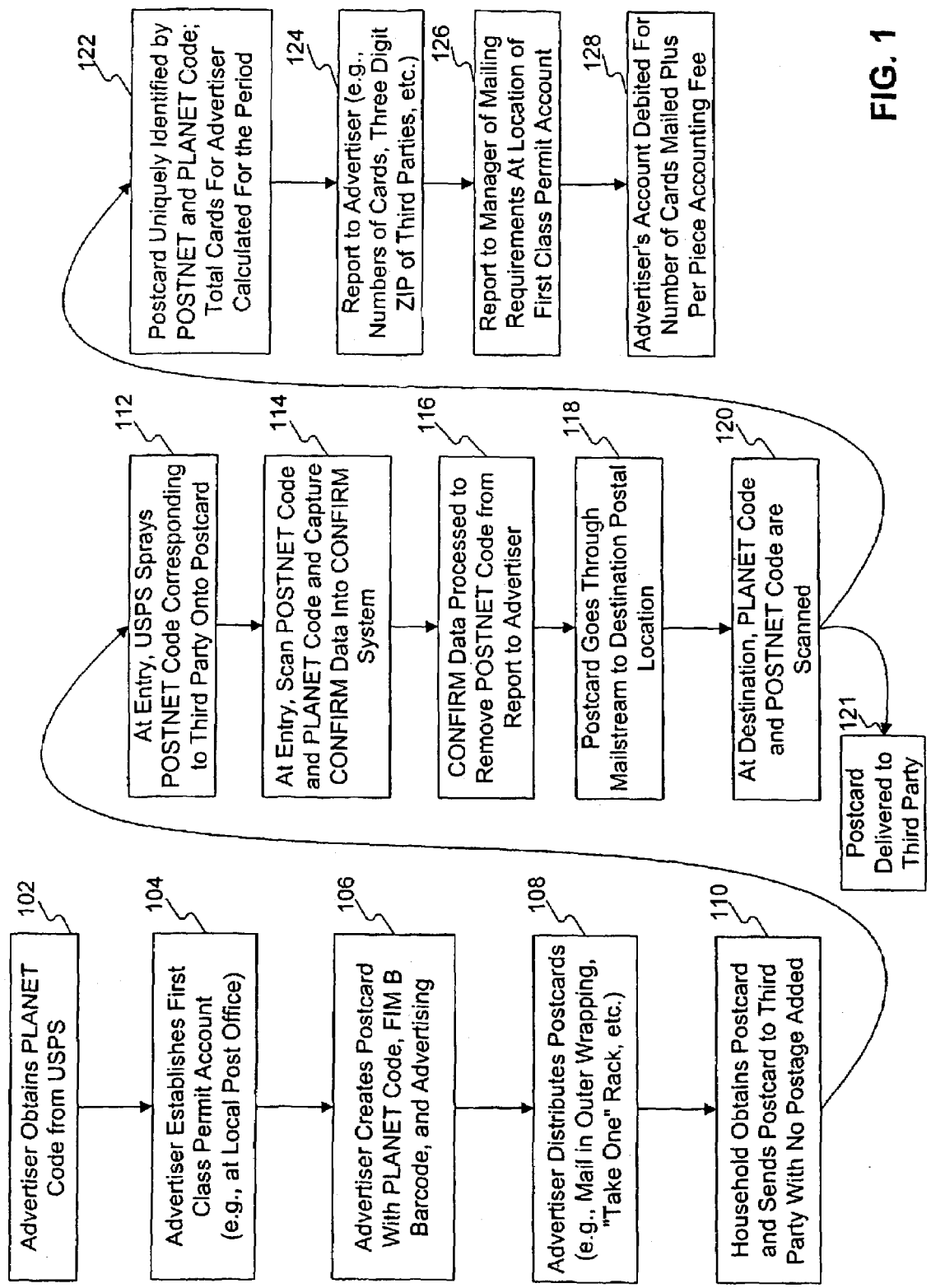
FIG. 1 is a flow chart of an exemplary friend-to-friend mailing scheme in accordance with methods and systems consistent with the present invention.

FIG. 1 is a flow chart of an exemplary friend-to-friend mailing scheme in accordance with methods and systems consistent with the present invention. A friend-to-friend mail system may enable one party such as, for example, a household, an individual, a family, or a business, to send a mailpiece such as, for example, a postcard, an envelope, or a package, to another party without adding postage. A fee for delivery of the mailpiece may be paid by a first party such as, for example, an advertiser, a sponsor, or a greeting card company, who provides the mailpiece to a second party such as, for example, a customer who then sends the mailpiece to a third party.

For example, a company may sell a greeting card to a customer who then sends the greeting card to a friend. The customer may pay one price including both the greeting card and the postage fee and provide the greeting card to a SP for delivery to the friend, and the SP may bill the company for delivery of the greeting card to the friend when the customer actually sends the greeting card.

The first party such as, for example, an advertiser or other sponsor, may interact with a SP and establish an account for delivery service. For example, an advertiser may obtain a PLANET™ code from the United States Postal Service (USPS™) (step 102). Detailed information regarding the PLANET™ bar code system is disclosed, for example, in USPS™ Publication 432, CONFIRM™: Mail Tracking Information Using PLANET Code™ (PUB 432), the entire contents of which are incorporated herein by reference. The first party may then establish a permit account, for example, at a local Post Office or through a centralized system, indicating that the first party will pay for postage for the mailpieces (step 104). The first party may mark the mailpiece with information identifying the first party such as, for example, a facing identification mark (FIM) such as the PLANET™ code or a POSTNET™ bar code (step 106). Detailed information regarding the POSTNET™ bar code system is disclosed, for example, in USPS™ Publication 25, Designing Letter and Reply Mail, Chapter 4, POSTNET™ Barcodes (PUB 25), the entire contents of which are incorporated herein by reference, and in the USPS™ POSTNET™ Barcode Certification Technical Guide (POSTNET), the entire contents of which are incorporated herein by reference.

The mailpiece may also include other markings such as, for example, a box that says "Friend-to-Friend Mail," and indication of where the permit is held, a PLANET™ bar code, a FIM B bar code, or an advertisement. The mailpiece may also include blank space, for example, so that the second party may write a message to the third party.

The first party may distribute the mailpieces in various ways (step 108). For example, the mailpiece may be inserted in a publication, placed in an outer wrapping, provided with another piece of mail, sold in a store, or made available on a "take-one" rack. The second party may obtain the mailpiece and then provide it to a SP for delivery to a third party (step 110). For example, a customer may purchase a mailpiece such as, for example, a postcard and then send the mailpiece to any address in the United States without placing any additional postage on the mailpiece.

When a SP receives the mailpiece it may be processed like other mailpieces. For example, the SP may mark the mailpiece with a POSTNET™ bar code corresponding to the third party (step 112) and then scan the POSTNET™ bar code and the PLANET™ bar code (step 114). The SP may capture information regarding the mailpiece for billing the first party. For example, the PLANET™ bar code may be entered into a database such as, for example, the CONFIRM™ system, which includes the POSTNET™ code, the PLANET™ code, and other data used for billing such as, for example, the date, time or SP processing facility. Detailed information regarding the CONFIRM™ database is disclosed, for example, in USPS™ Publication 432, CONFIRM™: Mail Tracking Information Using PLANET Code™ (PUB 432), the entire contents of which are incorporated herein by reference. The SP may use the data collected to uniquely identify and track each mailpiece. Therefore, the SP may preferably process the data collected to remove the address of the third party (step 116). For example, the SP may omit the POSTNET™ code from a report provided to the first party, so that the first party does not know the address of the third party.

After the data is collected, the mailpiece may be transported through the mailstream to the third party using the same processing steps as other mailpieces (step 118). The mailpiece may be scanned when the SP delivers it to the third party (step 120). For example, the PLANET™ bar code and POSTNET™ bar code may be scanned. Other information may also be captured when the mailpiece is scanned such as, for example, tracking data for the mailpiece including where the mailpiece is sorted, the time, or a facility code for the destination. Then the mailpiece may be delivered to the third party (step 121).

Because each mailpiece may be uniquely identified, as described above, a number of mailpieces processed for the first party may be calculated for a given period of time (step 122) and reported to the first party. The report may include, for example, the number of mailpieces delivered; a three-digit ZIP code or a five-digit ZIP code for each third party; and a three-digit ZIP code or a five-digit ZIP code for each second party. Using a three-digit ZIP code may enable the first party to determine a general area from which the mailpiece was sent, or a general area to which the mailpiece was delivered, without revealing the exact address of either the second party or the third party.

For example, the report may be provided to an employee of the first party such as, for example, a manager of mailing requirements, at a location specified in the first party's permit account (step 126). The first party's account may be debited, for example, by the manager for the number of mailpieces delivered and for an accounting fee per mailpiece (step 128). In one exemplary scheme, the first party may be required to maintain a minimum balance in the deposit account. Alternatively, billing may be performed at a centralized location.

Figure 2:
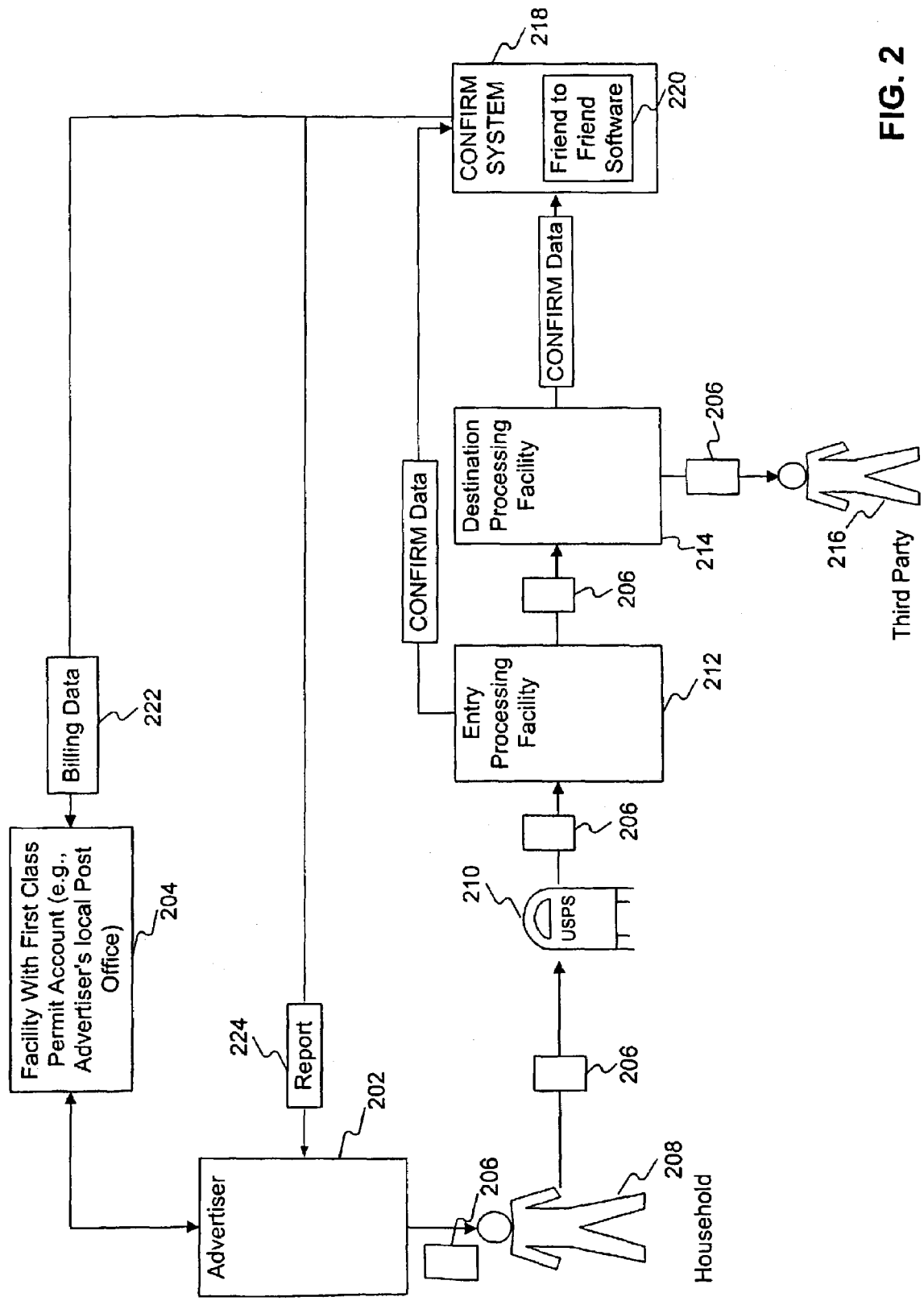
FIG. 2 is a block diagram of an exemplary friend-to-friend mailing model in which systems and methods consistent with the present invention may be implemented.

FIG. 2 is a block diagram of an exemplary friend-to-friend mailing transaction in which systems and methods consistent with the present invention may be implemented. A first party such as, for example, an advertiser 202 may interact with a SP facility 204 to establish a first class permit account. The first party may then create a mailpiece 206 such as, for example, a postcard and distribute the mailpiece 206 to a second party such as, for example, a household. The second party 208 may provide the mailpiece 206 to a SP, for example, by placing the mailpiece 206 into a collection box 210 for the mailstream. The mailpiece 206 may be transported to an entry processing facility 212 such as, for example, a USPS™ plant and information regarding the mailpiece 206 such as, for example, CONFIRM™ data may be gathered in a database such as, for example, the CONFIRM™ system 218 which includes Friend-to-Friend software 220. The mailpiece 206 may be processed at a destination processing facility 214 such as, for example, a local Post Office and then delivered to the third party 216. It is possible that the entry processing facility 212 and the destination processing facility 214 may be the same facility. The gathered data such as, for example, CONFIRM™ data may be processed by the Friend-to-Friend software 220 to generate billing data 222 which may be provided to a facility 204 which may debit the first class permit account, and a report may be sent to the first party 202. As mentioned previously, the permit account may be debited, for example, at the facility 204 where the first party 202 established the account or by using a centralized billing system.

Figure 3A:
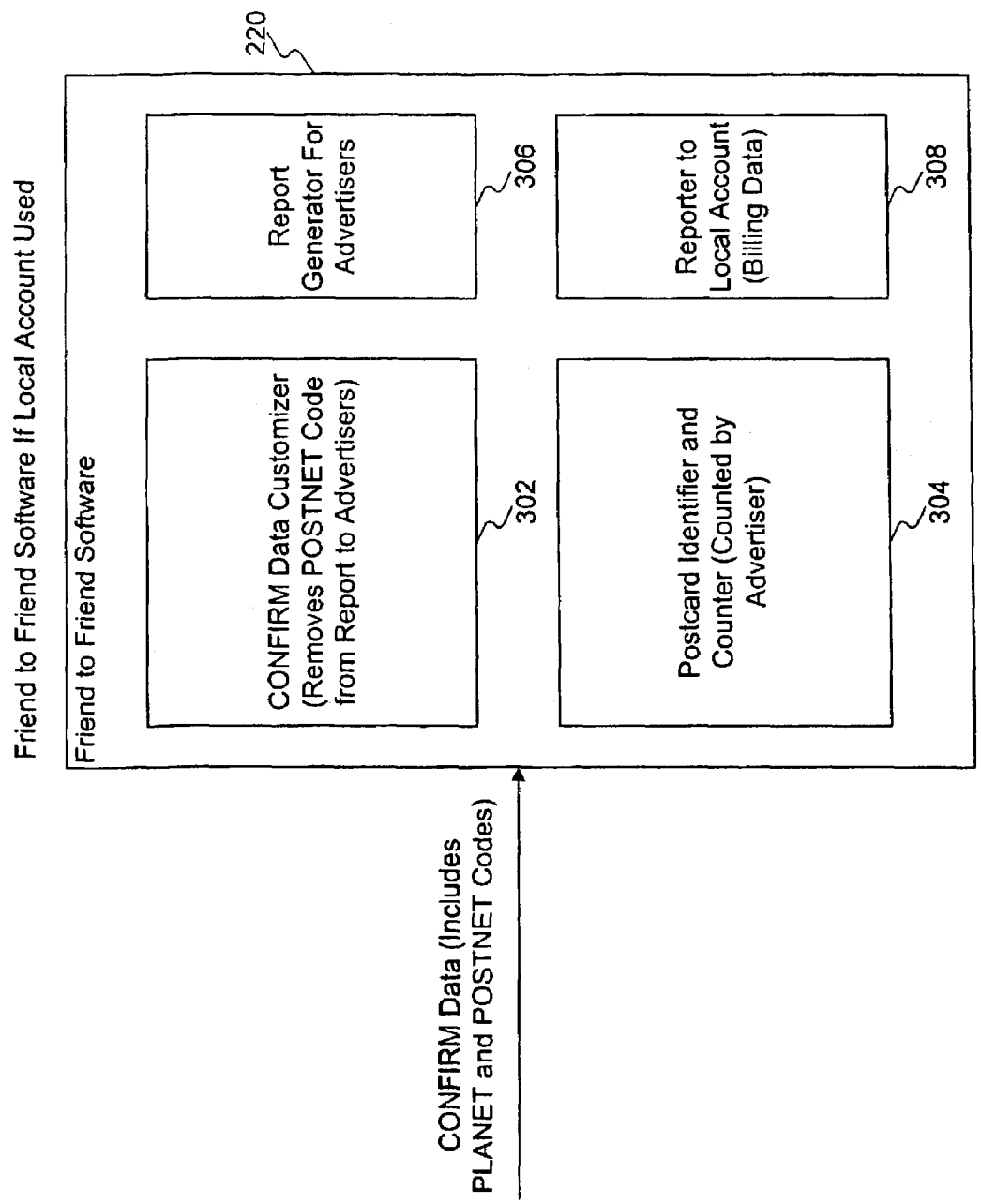
FIG. 3A illustrates an exemplary embodiment for billing a service fee to an account in accordance with methods and systems consistent with the present invention.

FIG. 3A illustrates an exemplary embodiment for billing a service fee to an account in accordance with methods and systems consistent with the present invention. As described above with reference to FIG. 2, the first party may be billed by the SP at a local office 204, or by using a centralized billing system. For example, FIG. 3A shows an exemplary embodiment in which the bill is debited from a local account. The Friend-to-Friend software 220 may include code for customizing the report 302 such as, for example, a CONFIRM™ data customizer that omits the POSTNET™ code from the report which is provided to the first party 202. The Friend-to-Friend software 220 may also include code for identifying a mailpiece 304 such as, for example, a Postcard Identifier and Counter which counts a number of postcards processed for the first party 202. The Friend-to-Friend software 220 may further include code for generating a report 306 for the first party 202 and code for reporting billing data for the local account 308.

Figure 3B:
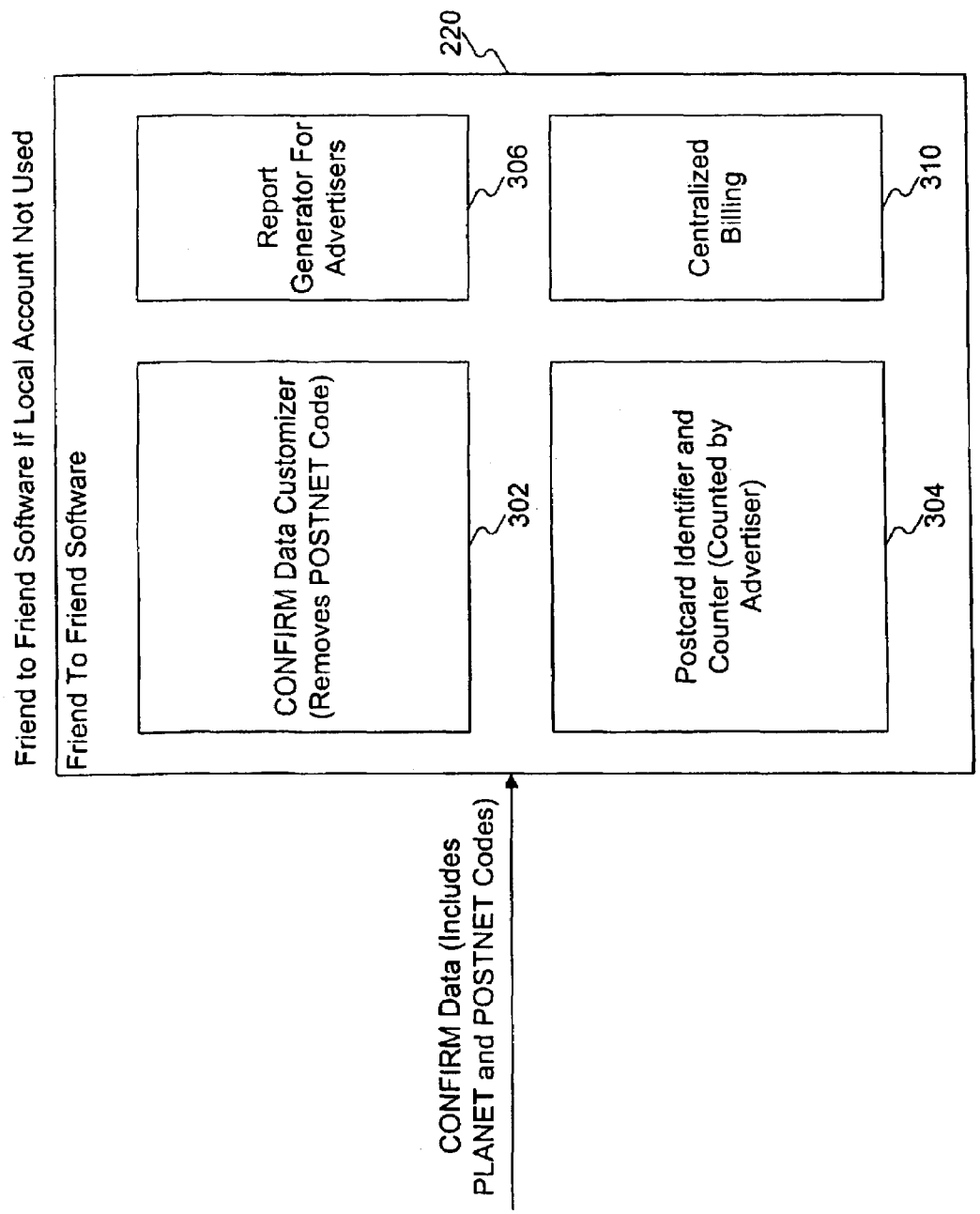
FIG. 3B illustrates an exemplary embodiment for billing a service fee using a centralized billing system in accordance with methods and systems consistent with the present invention.

FIG. 3B illustrates an exemplary embodiment for billing a service fee using a centralized billing system in accordance with methods and systems consistent with the present invention. The Friend-to-Friend software 220 may include code for collecting and processing billing data at a centralized location 310 such as, for example, using data gathered in the CONFIRM™ database.

Figure 4A:
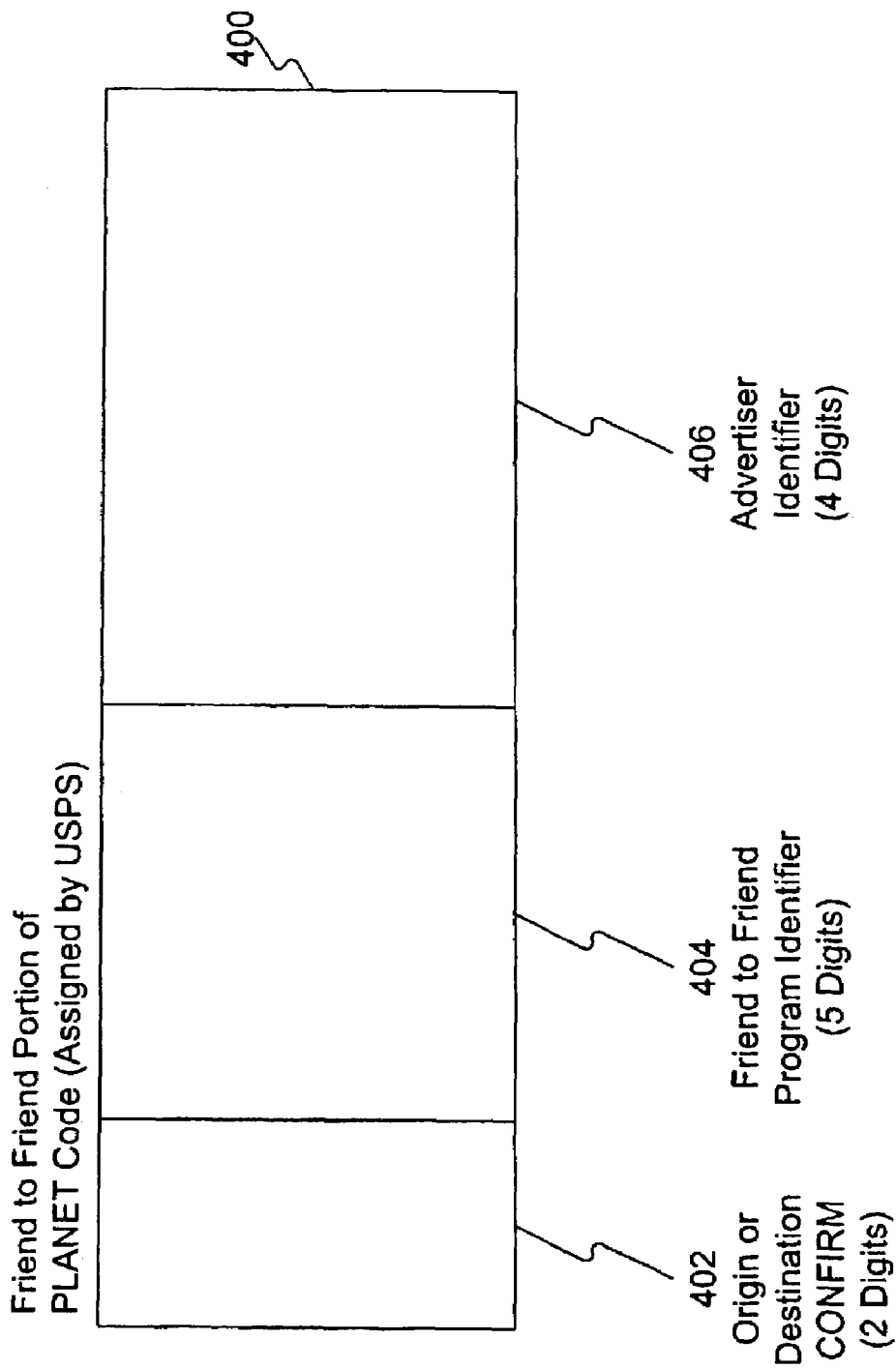
FIG. 4A illustrates an exemplary embodiment for a PLANET™ bar code for an advertiser in accordance with methods and systems consistent with the present invention.

FIG. 4A illustrates an exemplary embodiment for a PLANET™ bar code for an advertiser in accordance with methods and systems consistent with the present invention. The mailpiece may include, for example, information indicating whether to report when the SP receives the mailpiece from the second party 208, also known as "origin" service, or whether to report when the mailpiece 206 is delivered to the third party 216, also known as "destination" service. For example, the first two digits 402 may indicate that the first party 202 requests "origin" CONFIRM™ service, the next five digits 404 may indicate that the first party 202 has authorized Friend-to-Friend service for the mailpiece 206, and the next four digits 406 may identify the first party 202 to be billed.

Figure 4B:
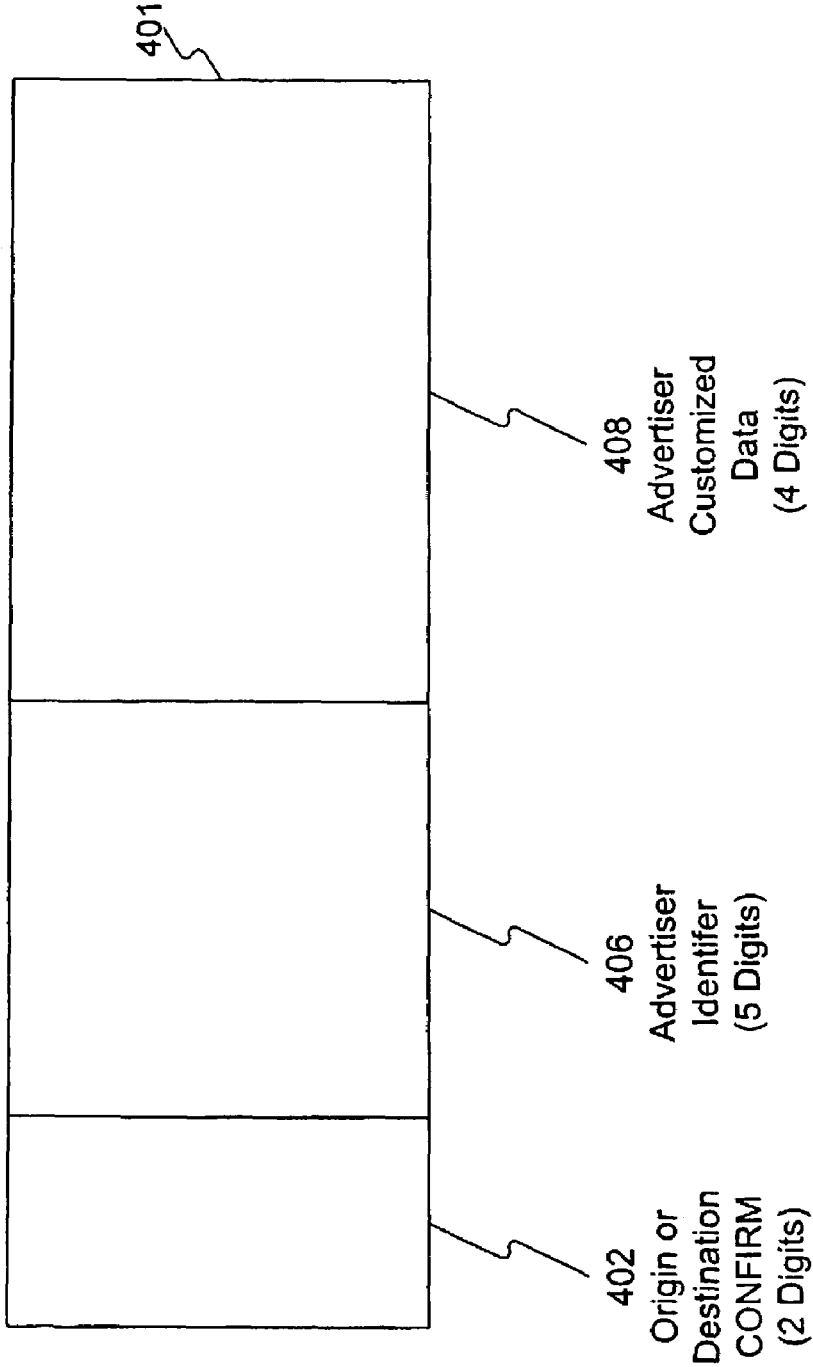
FIG. 4B illustrates an exemplary embodiment for a PLANET™ bar code with advertiser customized data, in accordance with methods and systems consistent with the present invention.

FIG. 4B illustrates an exemplary embodiment for a PLANET™ bar code with advertiser customized data, in accordance with methods and systems consistent with the present invention. For example, the first two digits 402 may indicate that the first party 202 requests "origin" CONFIRM™ service, the next five digits 406 may identify the first party 202 to be billed, and the value of the next four digits 408 may be determined by the first party 202 and may use the field to contain, for example, tracking data for an advertising campaign or for geographical tracking.

As described above, therefore, it will be apparent to those skilled in the art that various modifications and variations can be made in the apparatus and methods of the present invention without departing from the spirit and scope of the invention. Thus, it is intended that the present invention cover the modifications and variations of this invention, provided they come within the scope of the appended claims and their equivalents. In this context, equivalents mean each and every implementation for carrying out the functions recited in the claims, even if those particular functions are not explicitly described therein.

What is claimed is:

1. A method for providing a three party mailing service, comprising the steps of:
    enabling an advertiser to create a postcard marked with a unique code;
    receiving the postcard addressed to a third party from a household, wherein the household had not added any postage to the postcard;
    delivering the postcard to the third party; and
    billing the advertiser for the postage due for the delivery of the postcard to the third party.

2. The method of claim 1, further comprising the step of:
    reporting to the advertiser a total number of postcards delivered during a period of time.

3. The method of claim 1, wherein the billing step further includes the substep of:
    sending billing data to a manager of mailing requirements corresponding to the advertiser.

4. The method of claim 1, wherein the postcard is an envelope.

5. A method for providing a three party mailing service, comprising:
    enabling a first party to create a mailpiece marked with information identifying the first party;
    receiving the mailpiece from a second party, wherein the mailpiece is addressed to a third party;
    providing the mailpiece to a service provider for delivery; and
    billing the first party for delivery of the mailpiece.

6. The method of claim 5, further comprising:
    reporting to the first party a number of mailpieces delivered during a period of time.

7. The method of claim 5, wherein said billing the first party further includes:
    providing a bill to a service provider for delivery to the first party.

8. The method of claim 5, wherein the mailpiece is a postcard.

9. The method of claim 5, wherein the mailpiece is an envelope.

10. The method of claim 5, wherein said information identifying the first party is a bar code.

11. The method of claim 10, wherein said information identifying the first party is a PLANET bar code.

12. The method of claim 10, wherein said information identifying the first party is a POSTNET bar code.

13. A system for providing a three party mailing service, comprising:
    means for enabling a first party to create a mailpiece marked with information identifying the first party;
    means for receiving the mailpiece from a second party, wherein the mailpiece is addressed to a third party;
    means for providing the mailpiece to a service provider for delivery; and
    means for billing the first party for delivery of the mailpiece.

14. The system of claim 13, further comprising:
    means for reporting to the first party a number of mailpieces delivered during a period of time.

15. The system of claim 13, wherein said means for billing the first party further includes:
    means for providing a bill to a service provider for delivery to the first party.

16. The system of claim 13, wherein the mailpiece is a postcard.

17. The system of claim 13, wherein the mailpiece is an envelope.

18. The system of claim 13, wherein said information identifying the first party is a bar code.

19. The system of claim 18, wherein said information identifying the first party is a PLANET bar code.

20. The system of claim 18, wherein said information identifying the first party is a POSTNET bar code.

21. A computer program product, comprising a computer readable medium having computer program code embodied in said medium, for providing a three party mailing service, wherein the program code comprises:

code for enabling a first party to create a mailpiece marked with information identifying the first party;

code for receiving the mailpiece from a second party, wherein the mailpiece is addressed to a third party;

code for providing the mailpiece to a service provider for delivery; and code for billing the first party for delivery of the mailpiece.

* * * * *